United States Patent
Pontarelli et al.

(10) Patent No.: US 12,516,636 B1
(45) Date of Patent: Jan. 6, 2026

(54) ACCOMMODATION FOR MISMATCH IN GUIDE VANE FEEDBACK VIA UNDESIRED ENGINE BEHAVIOR

(71) Applicant: Pratt & Whitney Canada Corp., Longueuil (CA)

(72) Inventors: Robert Pontarelli, Brossard (CA); Andrew Ghattas, La Prairie (CA)

(73) Assignee: Pratt & Whitney Canada Corp., Longueuil (CA)

( * ) Notice: Subject to any disclaimer, the term of this patent is extended or adjusted under 35 U.S.C. 154(b) by 0 days.

(21) Appl. No.: 18/984,531

(22) Filed: Dec. 17, 2024

(51) Int. Cl.
*F02C 9/20* (2006.01)
*F02C 9/54* (2006.01)
*F01D 17/16* (2006.01)
*F04D 27/02* (2006.01)

(52) U.S. Cl.
CPC ............ *F02C 9/20* (2013.01); *F02C 9/54* (2013.01); *F01D 17/16* (2013.01); *F01D 17/162* (2013.01); *F01D 17/165* (2013.01); *F01D 17/167* (2013.01); *F04D 27/0246* (2013.01); *F05D 2270/101* (2013.01)

(58) Field of Classification Search
CPC .... F02C 9/20; F02C 9/54; F01D 17/16; F01D 17/162; F01D 17/165; F01D 17/167; F04D 27/0246; F05D 2270/101
See application file for complete search history.

(56) References Cited

U.S. PATENT DOCUMENTS

| | | | |
|---|---|---|---|
| 4,197,699 A | 4/1980 | Parker et al. | |
| 6,598,195 B1* | 7/2003 | Adibhatla | G01D 3/08 714/25 |
| 6,625,527 B1* | 9/2003 | Ding | B60T 8/1755 701/30.6 |
| 9,280,516 B2* | 3/2016 | Jiang | H04L 67/12 |
| 11,933,182 B2 | 3/2024 | Smith et al. | |
| 2018/0094533 A1* | 4/2018 | Gamm | F01D 21/003 |
| 2021/0341910 A1* | 11/2021 | Song | G05B 23/0235 |
| 2025/0206460 A1* | 6/2025 | Sly | B64D 45/00 |

FOREIGN PATENT DOCUMENTS

WO     2023148438 A1     8/2023

* cited by examiner

*Primary Examiner* — Gerald L Sung
*Assistant Examiner* — Rene D Ford

(57) ABSTRACT

A method for managing mismatches in feedback from guide vane sensors of a turbine engine with variable guide vanes includes selectively muting individual feedback channels and obtaining time series turbine performance data of the turbine engine associated with individual feedback channels. The feedback channel of the guide vane sensor associated with the best performing time series performance data can be selected as sole feedback channel following detection of a mismatch condition.

20 Claims, 2 Drawing Sheets

ACCOMMODATION FOR MISMATCH IN GUIDE VANE FEEDBACK VIA UNDESIRED ENGINE BEHAVIOR

TECHNICAL FIELD

This disclosure is generally directed to aircraft powertrain control. More specifically, this disclosure is directed accommodation of mismatch in guide vane feedback via undesired engine behavior.

BACKGROUND

Keeping turbine engines operating within the boundaries of reliable operation (for example, surge and stall limits) is a concern in turbine engine and turbine engine control system design. The potential consequences of a loss of turbine power from an engine stall or surge during flight are such that there is demand in the art for refinement and enhanced redundancy of the monitoring and control systems which control the engine and provide user and system controllers (for example, Fully Autonomous Digital Engine Controls ("FADECs") or electronic engine controllers (EECs)) with data regarding the current values of parameters describing the current operating state of a turbine engine. Levels of redundancy and assurance are used where monitoring of key engine parameters is concerned.

In turbine engines, the directional position of the stator guide vanes directing air into the compressor stages of the turbine can be an important engine operating parameter. Variable stator guide vanes adjust and direct the flow according to the current operating and power state of the aircraft and engine to ensure a stable flow of air into the engine, and an appropriate fuel/air mix at the combustion stage. Misadjusted stator guide vanes can interrupt the stable flow of air into the compressor, and by implication, enhance the risk of surges and stalls. As such, ensuring redundancy and high degrees of assurance that the engine control systems are obtaining the best available information regarding the current location of compressor guide vanes is a source of technical challenges and opportunities for improvement in the art.

SUMMARY

This disclosure is directed to accommodations for mismatches in guide vane feedback via monitoring of engine behavior.

In some examples, a method includes transmitting a first signal, to a variable guide vane (VGV) actuator, wherein the first signal commands the actuator to move variable guide vanes of a turbine engine to a first position. The method includes receiving from a first VGV sensor, first feedback on a current position of the variable guide vanes, receiving, from a second VGV sensor, second feedback on the current position of the variable guide vanes and comparing the first feedback to the second feedback to determine if a mismatch condition exists. Responsive to determining that a mismatch condition exists, the method includes transmitting second signals to the VGV actuator based on VGV feedback obtained by an engine controller from the first VGV sensor, and excluding VGV feedback obtained from the second VGV sensor, during a first finite interval, obtaining first time series turbine performance data during the first finite interval, upon completion or termination of the first finite interval, transmitting third signals to the VGV actuator based on VGV feedback obtained by the engine controller from the second VGV sensor, and excluding VGV feedback obtained from the first VGV sensor, during a second finite interval, obtaining second time series turbine performance data during the second finite interval, performing a ranked comparison between the first time series turbine performance data and the second time series turbine performance data and based on the ranked comparison, selecting between one of the first VGV sensor or the second VGV sensor to provide VGV feedback to the engine controller.

In some examples, an apparatus includes a controller; and an interface connecting the controller to a VGV actuator, and a first VGV sensor, and a second VGV sensor. The controller can be configured to transmit a first signal, to the VGV actuator, wherein the first signal commands the actuator to move variable guide vanes of a turbine engine to a first position, receive, from the first VGV sensor, first feedback on a current position of the variable guide vanes, receive, from the second VGV sensor, second feedback on the current position of the variable guide vanes, and compare the first feedback to the second feedback to determine if a mismatch condition exists. Responsive to determining that a mismatch condition exists, the controller can be configured to transmit second signals to the VGV actuator based on VGV feedback obtained by an engine controller from the first VGV sensor, and excluding VGV feedback obtained from the second VGV sensor, during a first finite interval, obtain first time series turbine performance data during the first finite interval, upon completion or termination of the first finite interval, transmit third signals to the VGV actuator based on VGV feedback obtained by the engine controller from the second VGV sensor, and excluding VGV feedback obtained from the first VGV sensor, during a second finite interval, obtain second time series turbine performance data during the second finite interval, perform a ranked comparison between the first time series turbine performance data and the second time series turbine performance data, and based on the ranked comparison, select between one of the first VGV sensor or the second VGV sensor to provide VGV feedback to the engine controller.

In some examples, a non-transitory computer-readable medium includes instructions, which, when executed by a processor, cause a controller to transmit a first signal, to a VGV actuator, wherein the first signal commands the actuator to move variable guide vanes of a turbine engine to a first position, receive, from a first VGV sensor, first feedback on a current position of the variable guide vanes, receive, from a second VGV sensor, second feedback on the current position of the variable guide vanes, and compare the first feedback to the second feedback to determine if a mismatch condition exists. Responsive to determining that a mismatch condition exists, when executed by the processor, the instructions further cause the controller to transmit second signals to the VGV actuator based on VGV feedback obtained by an engine controller from the first VGV sensor, and excluding VGV feedback obtained from the second VGV sensor, during a first finite interval, obtain first time series turbine performance data during the first finite interval, upon completion or termination of the first finite interval, transmit third signals to the VGV actuator based on VGV feedback obtained by the engine controller from the second VGV sensor, and excluding VGV feedback obtained from the first VGV sensor, during a second finite interval, obtain second time series turbine performance data during the second finite interval, perform a ranked comparison between the first time series turbine performance data and the second time series turbine performance data, and based on the ranked comparison, select between one of the first VGV sensor or the second VGV sensor to provide VGV feedback to the engine controller.

Any single one or any combination of the following features may be used with the examples above.

The first time series turbine performance data and the second time series turbine performance data can be values of one or more measured parameters of turbine performance. The values of the one or more measured parameters of turbine performance can be at least one of: a turbine temperature, a turbine speed, or a compressor pressure. The first time series turbine performance data and the second time series turbine performance data comprise values of one or more calculated parameters of turbine performance. The values of the one or more calculated parameters of turbine performance can include at least one of: a fuel consumption, or a power output. One or more of the first finite interval or the second finite interval can end in response to one or more of the first time series turbine performance data or the second time series turbine performance data satisfying or failing a predetermined criteria. The first time series turbine performance data and the second time series turbine performance data can be compared against a threshold value, and responsive to determining that both of the first time series turbine performance data and the second time series turbine performance data are below the threshold value, the controller can perform one or more of: powering down the turbine engine, or switching the turbine engine to a low-power state.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

Figure 1:
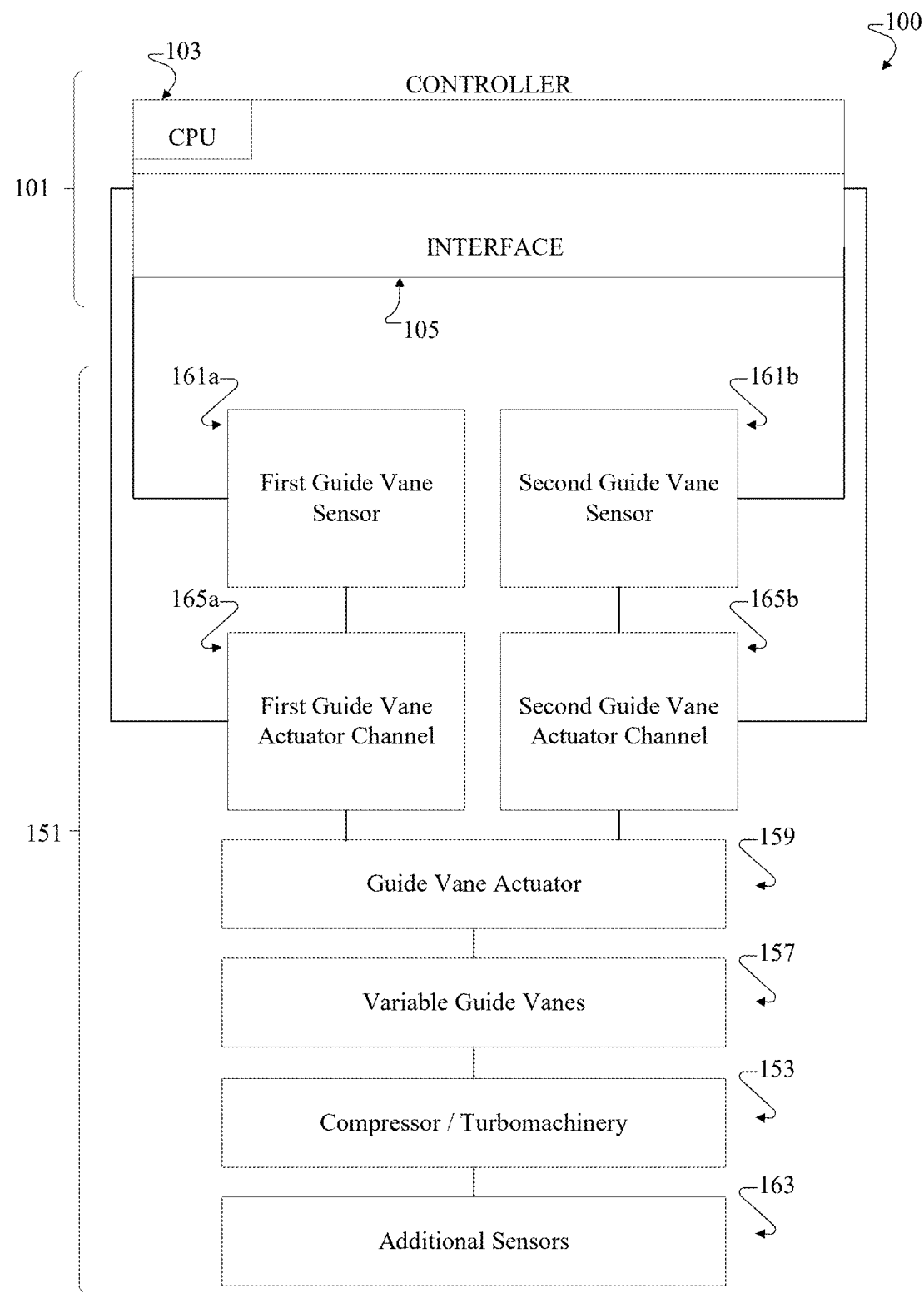
FIG. 1 illustrates an example system for managing mismatches in guide vane feedback according to this disclosure.
Figure 2:
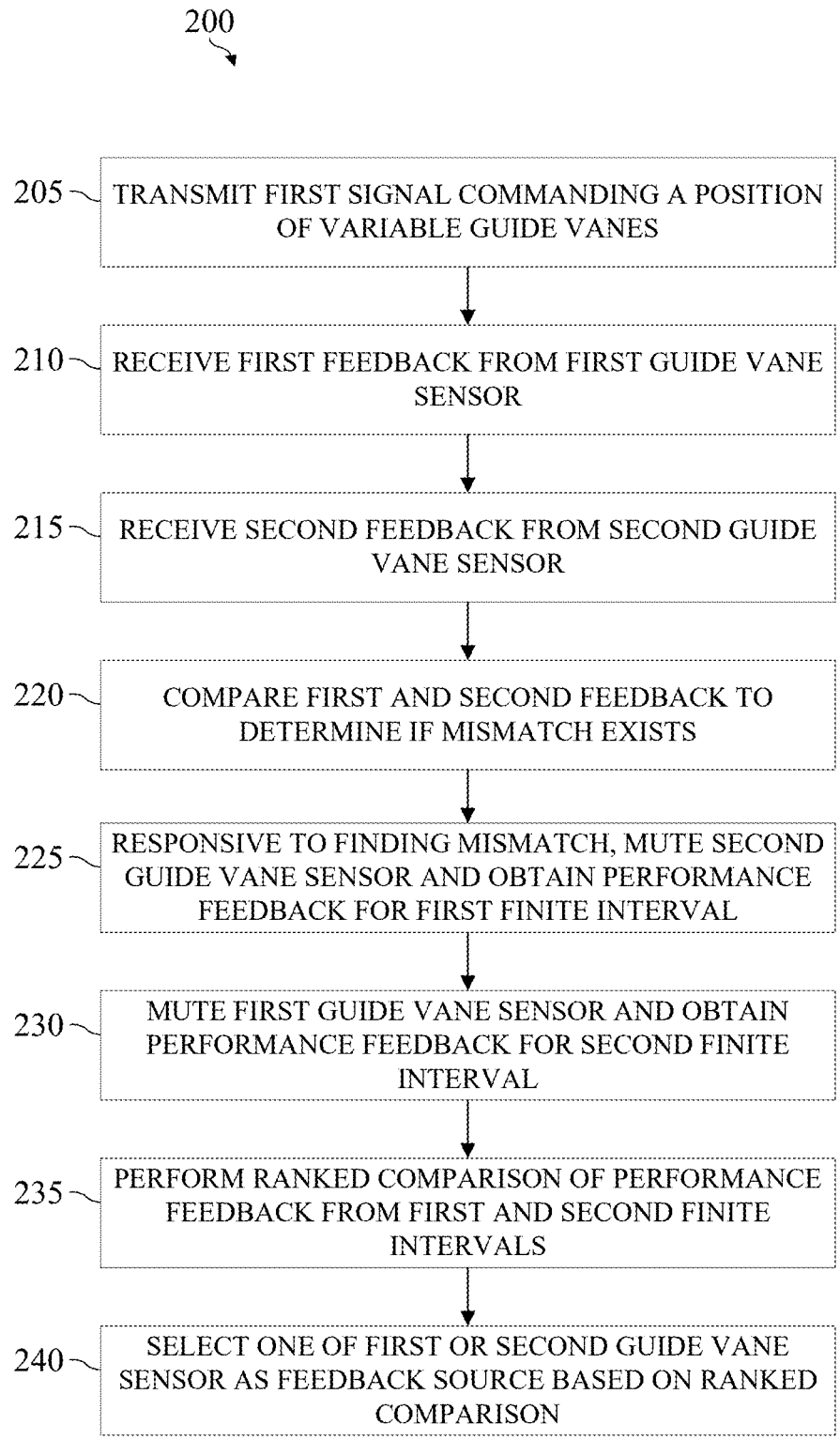
FIG. 2 illustrates operations of an example method managing mismatches in guide vane feedback according to this disclosure.

FIGS. 1 through 2, described below, and the various embodiments used to describe the principles of the present disclosure are by way of illustration only and should not be construed in any way to limit the scope of this disclosure. Those skilled in the art will understand that the principles of the present disclosure may be implemented in any type of suitably arranged device or system.

Keeping turbine engines operating within the boundaries of reliable operation (for example, surge and stall limits) is a perennial concern in turbine engine and turbine engine control system design. The potential consequences of a loss of turbine power from an engine stall or surge during flight are, without exaggeration, such that there is a near-insatiable demand in the art for refinement and enhanced redundancy of the monitoring and control systems which control the engine and provide user and system controllers (for example, Fully Autonomous Digital Engine Controls ("FADECs") or electronic engine controllers (EECs)) with data regarding the current values of parameters describing the current operating state of a turbine engine. Guide vane feedback, or information regarding the current position of the variable stator guide vanes directing air into compressor stages of a turbine engine is one of a plurality of parameters describing the likelihood of an engine approaching its stall or surge limits. Accordingly, providing redundancy and increased assurance that pilots and engine control systems are provided with the best available guide vane feedback is a source of technical challenges within the art.

Embodiments according to the present disclosure provide methods, apparatus, and computer-readable program products for accommodating and managing mismatches in guide vane feedback using desired engine behavior.

FIG. 1 illustrates an example system 100 for implementing accommodation for mismatches in guide vane feedback via undesired engine behavior according to this disclosure. Skilled artisans will appreciate that example system 100 is intended to be illustrative, rather than limitative of, embodiments according to this disclosure.

Referring to the illustrative example of FIG. 1, system 100 comprises a controller 101 and a turbine engine 151 operating, at least in part, under the control of controller 101. In this example, controller 101 can be a fully autonomous digital engine control ("FADEC") type controller, an Electronic Engine Controller ("EEC") or other electronic, electric, or electromechanical controller capable of implementing control logic for controlling turbine engine 151 based on sensor data, wherein the sensor data includes two channels of guide vane feedback describing a current position of a set of stator guide vanes whose position controls an angle at which air is directed towards rotors of the compressor 153 and downstream turbomachinery of turbine engine 151. Turbine engine 151 can be any species of turbine engine which utilizes variable stator guide vanes to tune the flow of air into a compressor stage of the engine. Turbine engine 151 can be, for example, a turbofan engine, a turbojet engine, a turboprop engine, or a turboshaft engine. Additionally, turbine engine 151 can be one of, or the only engine under the control of controller 101.

As shown in the figure, controller 101 comprises a processor 103 configured to execute instructions stored in a memory or encoded as logical functions of the processor itself. Processor 103 can be a general-purpose CPU type processor, or an application specific processor (for example, an application specific integrated controller ("ASIC") or field programmable gate array ("FPGA")). Controller 101 further comprises one or more interfaces 105 for receiving sensor data from sensors disposed with engine 151 and ancillary systems (for example, fuel supply systems) of engine 151.

Engine 151 further comprises at least one set of variable guide vanes 157 which regulate the angle and flow of air towards compressor 153. The position of guide vanes 157 can be adjusted by one or more actuators 159, which operate in response to control signals from controller 101. Actuators 159 can be one or more of hydraulic or electrical actuators capable of generating sufficient mechanical force to change the position of the guide vanes and offering granular positional control over their travel. System 100 further comprises two or more guide vane position sensors 161a and 161b (for example, variable differential transformers) which provide controller 101, via interface 105 with data as to the current measured position of the guide vanes. In some embodiments, controller 101 maintains two separate communication channels for sending control signals to guide vane actuator 159. Referring to the illustrative example of FIG. 1, system 100 comprises a first guide vane actuator channel 165a and a second guide vane actuator channel 165b. Similarly, feedback from first guide vane sensor 161a can be provided to controller 101 via a first feedback channel, and feedback from second guide vane sensor 161*b* can be provided to controller 101 via a second feedback channel. The present disclosure contemplates multiple possible feedback and control architectures. Interface 105 can be any interface by which controller 101 can receive, via protocols suitable for use in aircraft engine control systems (for example, control area network busses ("CANBUS")) data from engine sensors, and transmit control inputs to other components.

As shown in the figure, Engine 151 further comprises one or more additional sensors 163, which also connect, via interface 105 to controller 101. Additional sensors 163 include one or more sensors which measure parameters that either singly, or in combination with other, non-engine parameters (for example, altitude or air speed), can be strongly correlated with current engine performance, including without limitation, sensors measuring fuel consumption, engine temperature, or engine power output.

During normal operation, the guide vane feedback received at controller 101 from first guide vane position sensor 161*a* and second guide vane position sensor 161*b* correspond (within some range of variation) to one another. However, by their nature, sensors degrade, break, or, by dint of their use in aviation applications, are damaged by fast-moving detritus in the engine environment. As such, mismatches in the guide vane feedback obtained from first guide vane position sensor 161*a* versus the guide vane feedback obtained second guide vane sensor 161*b* are a highly foreseeable error condition. In the event of a mismatch, it is desirable that controller 101 be provided with the best available feedback regarding the current position of guide vanes 157. In other words, it is desirable that, if presented with a guide vane feedback mismatch, controller 101 has some way of excluding guide vane feedback which is more likely to result in improper operation of the turbine.

While adding more guide vane sensors or providing sensors for monitoring the status of first and second guide vane position sensors 161*a*-161*b* appears to be a tempting approach. However, simply "scaling up" the number of sensors or concatenating sensors-upon-sensors is, at best, a partial solution, and in many cases, not even a solution at all. This is because, to the extent the airframe and nacelles holding engine 151 can even accommodate additional sensors, the addition of more sensors can impose size, weight, and power ("SWAP") penalties, which are undesirable or untenable in aircraft applications. Additionally, given the multiple interdependencies between control systems of modern aircraft, the additional sensors may not be supported by existing control systems. Given the likelihood of SWAP penalties and connectivity issues, finding solutions to resolving mismatches in guide vane feedback within an existing sensor/controller architecture, though more challenging, can be significantly preferable to brute force approaches premised on adding further layers of sensing hardware.

According to certain embodiments, controller 101 is configured to issue a command to actuators 159 to set the variable guide vane 157 to a certain position. Further, controller 101 is configured to receive from both of first guide vane position sensor 161*a* and second guide vane sensor 161*b*, guide vane feedback regarding the measured position of guide vanes. Subsequently, controller 101 compares the VGV feedback from first guide vane position sensor 161*a* against the VGV feedback from second guide vane sensor 161*b* and determines whether the feedback across the two sensor channels matches. As used in this disclosure, "matching" in the context of variable guide vane feedback encompasses that the measured values at each sensor are within a predetermined error range of one another.

In an event that the VGV feedback from first guide vane position sensor 161*a* matches the VGV feedback from the second guide vane sensor 161*b*, the processor can be configured to wait until the engine control logic commands that the variable guide vane 157 be moved to a new position.

In an event that the VGV feedback from first guide vane position sensor 161*a* does not match the VGV feedback from second guide vane sensor 161*b*, then processor is configured to determine which of first guide vane position sensor 161*a* and second guide vane sensor 161*b* provides the best guide vane position feedback to ensure reliable, predictable operation of engine 151.

According to certain embodiments, in response to determining a mismatch in the guide vane feedback, controller 101 is configured to determine, based on sensor data from sensors 163, a value of one or more measured or calculated parameters which is correlative with the overall performance of engine 151. Examples of measured or calculated parameters which are correlative of the quality of the overall performance of engine 151 include, without limitation, fuel consumption, engine temperature, power output, or turbine speed.

Controller 101 is further configured to, for a first interval, control variable guide vanes 157 based solely on feedback obtained from first guide vane position sensor 161*a*. During the first interval, controller 101 is further configured to determine and record values of the one or more measured or calculated parameters that are correlative of the quality of engine performance. The duration of the first interval may be preset (for example, 15 or 30 seconds). Additionally, or alternatively, the duration of the first interval may be bounded by achievement of a performance criteria or an error condition (for example, a drop in turbine speed, excessive rise in temperature, drop in power, etc.)

Upon conclusion or termination of the first interval, controller 101 is configured to control variable guide vanes 157 based solely on feedback obtained from second guide vane sensor 161*b*. Here again, during the second interval, controller 101 is configured to determine and record values of the one or more measured or calculated parameters correlative of the quality of the performance of engine 151. As with the first interval, the duration of the second interval can be preset, or, additionally or alternatively, terminated or extended based on achievement of a performance criteria or an error condition (for example, approaching a stall or surge condition).

Upon conclusion or termination of the second interval, controller 101 compares the values of the one or more parameters obtained during the first interval against the values obtained during the second interval and performs a determination of which interval of better engine performance was associated with guide vane sensor's feedback.

Additionally, or alternatively, controller 101 can compare the values of the one or more parameters correlative of the quality of engine performance against reference, or threshold values. In an event where the performance data obtained over both the first interval and the second interval falls short of the reference or threshold values, controller 101 may take further action, such as powering down engine 151, or transferring it to a standby, or low-power state.

Although FIG. 1 illustrates one example of a system 100 for implementing accommodation for mismatches in guide vane feedback via undesired engine behavior, various changes may be made to FIG. 1. For example, the system 100 could include any number of each component in any suitable arrangement. In general, control systems come in a wide variety of configurations, and FIG. 1 does not limit the scope of this disclosure to any particular configuration. Also, while FIG. 1 illustrates one operational environment in which various features disclosed in this patent document can be used, these features could be used in any other suitable system.

FIG. 2 illustrates an example method 200 for accommodating guide vane feedback from a turbine engine according to this disclosure. The operations described with reference to FIG. 2 can, in some embodiments, be performed by a purely digital controller (for example, controller 101 in FIG. 1) with one or more interfaces to sensor and control systems of a turbine engine (for example, engine 151 in FIG. 1), such as a FADEC or EEC. Additionally, or alternatively, the operations described with reference to FIG. 2 can be performed with other controller architectures, such as analog controllers or electromechanical controllers.

Referring to the illustrative example of FIG. 2, at operation 205, the controller transmits (for example, via interface 105 in FIG. 1) a first signal, wherein the first signal commands an actuator (for example, actuator 159 in FIG. 1) to set variable guide vanes to a specified position.

At operation 210, the controller receives, from a first guide vane sensor (for example, first guide vane position sensor 161a in FIG. 1) first feedback regarding a measured current position of the variable guide vanes following issuance of the first signal at operation 205. In other words, the first feedback comprises data, which, assuming accurate operation of the first guide vane sensor, confirms or disconfirms whether the variable guide vanes are in the position specified by the first signal.

At operation 215, the controller receives, from a second guide vane sensor (for example, second guide vane sensor 161b in FIG. 1) second feedback regarding the measured current position of the variable guide vanes following issuance of the first signal at operation 205. Here again, the second feedback comprises additional data, which, assuming accurate operation of the second guide vane sensor, confirms or disconfirms whether the variable guide vanes are in the position specified by the first signal.

At operation 220, the controller compares the first and second feedback and determines whether the measured position values of the variable guide vanes sufficiently correspond to one another (for example, by differing less than a pre-specified error value). In the event that the first and second feedback sufficiently correspond to one another, no mismatch condition is found, and the controller implements its default control logic for measuring variable guide vane position. In some instances, in response to determining that no mismatch condition exists, method 200 reverts to operation 205, and controller does not obtain further guide vane position feedback until issuance of the next control signal commanding a new position of the variable guide vanes. In some instances, the default control logic may, in response to determining that no mismatch condition exists, method 200 can, after some specified interval, return to operation 210, thereby performing a follow-on check of the correspondence between channels of guide vane position feedback. During the ordinary course of operation, the first and second feedback match, and method 200 does not need to progress beyond operation 215.

As shown in the figure, at operation 225, responsive to determining at operation 220 that a mismatch condition exists, the controller begins a controlled test to determine, as between the first guide vane sensor and the second guide vane sensor, which sensor's feedback is most compatible with proper operation of the turbine. At operation 225, the controller transmits one or more second signals, wherein the second signals "mute" the second feedback from the second guide vane sensor and control the position of the variable guide vanes based on feedback from the first guide vane sensor for a first finite interval. During the first finite interval, the processor also collects time series performance data of the turbine engine while guide vane positioning is performed based on first feedback from the first guide vane position sensor.

As noted elsewhere in this disclosure, the time series performance data of the turbine engine can comprise time series data of a measured parameter of the engine (for example, temperature) that is correlative of engine performance. Additionally, or alternatively, the time series performance data of the turbine engine can comprise time series data of a calculated parameter (for example, power or fuel consumption) that is correlative of engine performance.

In some embodiments, the first finite interval concludes at the end of a predetermined time interval (for example, twenty seconds). Additionally, or alternatively, the first finite interval concludes with upon realization of one or more predetermined conditions (for example, a loss of airspeed, or loss of power).

At operation 230, responsive to conclusion of the first finite interval, the controller performs the second half of the performance-based A/B test between first feedback obtained by the first guide vane sensor and second feedback obtained by the second guide vane sensor. At operation 230, first feedback from the first guide vane sensor is muted, and the variable guide vane positioning is controlled based on second feedback from the second guide vane sensor for a second finite interval. During the second finite interval, time series performance data of the turbine engine continues to be obtained.

As with the first finite interval, the duration of the second finite interval can be based on one or more of a predetermined time limit, and one or more termination criteria.

At operation 235, upon conclusion of the second finite interval, the controller performs a ranked comparison of the time series data obtained in the first finite interval relative to the time series data obtained in the second finite interval and determines which interval was associated with better measured turbine engine performance. At operation 235, the controller can also compare the time series data obtained in the first and second finite intervals against one or more threshold or reference values, thereby ensuring that engine performance under the "winning" guide vane sensor satisfies one or more minimum quality criteria.

At operation 240, the controller selects, based on the ranked comparison, one of the first guide vane sensor and the second guide vane sensor, as the source of guide vane feedback for continued operation of the turbine. Additionally, in embodiments where the first and second time series data are compared against one or more threshold or reference values, the controller can, if neither time series data meets the standards of the one or more threshold or reference values, power down the turbine engine completely, or switch it to a low-power or standby state.

Although FIG. 2 illustrates one example of a method 200 for accommodating guide vane feedback from a turbine engine, various changes may be made to FIG. 2. For example, while shown as a series of steps, various steps in FIG. 2 could overlap, occur in parallel, occur in a different order, or occur any number of times (including zero times).

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive (HDD), a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable storage device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present disclosure should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:
   transmitting a first signal, to a variable guide vane (VGV) actuator, wherein the first signal commands the actuator to move variable guide vanes of a turbine engine to a first position;
   receiving, from a first VGV sensor, first feedback on a current position of the variable guide vanes;
   receiving, from a second VGV sensor, second feedback on the current position of the variable guide vanes;
   comparing the first feedback to the second feedback to determine if a mismatch condition exists; and
   responsive to determining that the mismatch condition exists:
      transmitting second signals to the VGV actuator based on VGV feedback obtained by an engine controller from the first VGV sensor, and excluding VGV feedback obtained from the second VGV sensor, during a first finite interval;
      obtaining first time series turbine performance data during the first finite interval;
      upon completion or termination of the first finite interval, transmitting third signals to the VGV actuator based on VGV feedback obtained by the engine controller from the second VGV sensor, and excluding VGV feedback obtained from the first VGV sensor, during a second finite interval;
      obtaining second time series turbine performance data during the second finite interval;
      performing a ranked comparison between the first time series turbine performance data and the second time series turbine performance data; and
      based on the ranked comparison, selecting between one of the first VGV sensor or the second VGV sensor to provide VGV feedback to the engine controller.

2. The method of claim 1, wherein the first time series turbine performance data and the second time series turbine performance data comprise values of one or more measured parameters of turbine performance.

3. The method of claim 2, wherein the values of the one or more measured parameters of turbine performance comprise at least one of:
   a turbine temperature;
   a turbine speed; or
   a compressor pressure.

4. The method of claim 1, wherein the first time series turbine performance data and the second time series turbine performance data comprise values of one or more calculated parameters of turbine performance.

5. The method of claim 4, wherein the values of the one or more calculated parameters of turbine performance comprise at least one of:
   a fuel consumption; or
   a power output.

6. The method of claim 1, wherein one or more of the first finite interval or the second finite interval ends in response to one or more of the first time series turbine performance data or the second time series turbine performance data satisfying or failing a predetermined criteria.

7. The method of claim 1, further comprising:
   comparing the first time series turbine performance data and the second time series turbine performance data against a threshold value; and
   responsive to determining that both of the first time series turbine performance data and the second time series turbine performance data are below the threshold value, performing one or more of:
      powering down the turbine engine; or
      switching the turbine engine to a low-power state.

8. An apparatus comprising:
a controller; and
an interface connecting the controller to a variable guide vane (VGV) actuator, and a first VGV sensor, and a second VGV sensor,
wherein the controller is configured to:
  transmit a first signal, to the VGV actuator, wherein the first signal commands the actuator to move variable guide vanes of a turbine engine to a first position;
  receive, from the first VGV sensor, first feedback on a current position of the variable guide vanes;
  receive, from the second VGV sensor, second feedback on the current position of the variable guide vanes;
  compare the first feedback to the second feedback to determine if a mismatch condition exists; and
  responsive to determining that the mismatch condition exists:
    transmit second signals to the VGV actuator based on VGV feedback obtained by an engine controller from the first VGV sensor, and excluding VGV feedback obtained from the second VGV sensor, during a first finite interval;
    obtain first time series turbine performance data during the first finite interval;
    upon completion or termination of the first finite interval, transmit third signals to the VGV actuator based on VGV feedback obtained by the engine controller from the second VGV sensor, and excluding VGV feedback obtained from the first VGV sensor, during a second finite interval;
    obtain second time series turbine performance data during the second finite interval;
    perform a ranked comparison between the first time series turbine performance data and the second time series turbine performance data; and
    based on the ranked comparison, select between one of the first VGV sensor or the second VGV sensor to provide VGV feedback to the engine controller.

9. The apparatus of claim 8, wherein the first time series turbine performance data and the second time series turbine performance data comprise values of one or more measured parameters of turbine performance.

10. The apparatus of claim 9, wherein the values of the one or more measured parameters of turbine performance comprise at least one of:
a turbine temperature;
a turbine speed;
or a compressor pressure.

11. The apparatus of claim 8, wherein the first time series turbine performance data and the second time series turbine performance data comprise values of one or more calculated parameters of turbine performance.

12. The apparatus of claim 11, wherein the values of the one or more calculated parameters of turbine performance comprise at least one of:
a fuel consumption; or
a power output.

13. The apparatus of claim 8, wherein one or more of the first finite interval or the second finite interval ends in response to one or more of the first time series turbine performance data or the second time series turbine performance data satisfying or failing a predetermined criteria.

14. The apparatus of claim 8, wherein the controller is further configured to:
compare the first time series turbine performance data and the second time series turbine performance data against a threshold value; and
responsive to determining that both of the first time series turbine performance data and the second time series turbine performance data are below the threshold value, perform one or more of:
  powering down the turbine engine; or
  switching the turbine engine to a low-power state.

15. A non-transitory machine-readable medium comprising instructions, which, when executed by a processor, cause a controller to:
transmit a first signal, to a variable guide vane (VGV) actuator, wherein the first signal commands the actuator to move variable guide vanes of a turbine engine to a first position;
receive, from a first VGV sensor, first feedback on a current position of the variable guide vanes;
receive, from a second VGV sensor, second feedback on the current position of the variable guide vanes;
compare the first feedback to the second feedback to determine if a mismatch condition exists; and
responsive to determining that the mismatch condition exists:
  transmit second signals to the VGV actuator based on VGV feedback obtained by an engine controller from the first VGV sensor, and excluding VGV feedback obtained from the second VGV sensor, during a first finite interval;
  obtain first time series turbine performance data during the first finite interval;
  upon completion or termination of the first finite interval, transmit third signals to the VGV actuator based on VGV feedback obtained by the engine controller from the second VGV sensor, and excluding VGV feedback obtained from the first VGV sensor, during a second finite interval;
  obtain second time series turbine performance data during the second finite interval;
  perform a ranked comparison between the first time series turbine performance data and the second time series turbine performance data; and
  based on the ranked comparison, select between one of the first VGV sensor or the second VGV sensor to provide VGV feedback to the engine controller.

16. The non-transitory machine-readable medium of claim 15, wherein the first time series turbine performance data and the second time series turbine performance data comprise values of one or more measured parameters of turbine performance.

17. The non-transitory machine-readable medium of claim 16, wherein the values of the one or more measured parameters of turbine performance comprise at least one of:
a turbine temperature;
a turbine speed; or
a compressor pressure.

18. The non-transitory machine-readable medium of claim 15, wherein the first time series turbine performance data and the second time series turbine performance data comprise values of one or more calculated parameters of turbine performance.

19. The non-transitory machine-readable medium of claim 18, wherein the values of the one or more calculated parameters of turbine performance comprise at least one of:
a fuel consumption; or
a power output.

20. The non-transitory machine-readable medium of claim 15, wherein one or more of the first finite interval or the second finite interval ends in response to one or more of the first time series turbine performance data or the second time series turbine performance data satisfying or failing a predetermined criteria.

* * * * *